June 12, 1956  W. J. McILVANE  2,749,607
METHOD OF PRODUCING COMPOSITE CURVED METALLIC SHAPES
Filed Nov. 15, 1950

INVENTOR
William J. McIlvane
by Hooper, Leonard & Glenn
his attorneys

United States Patent Office 2,749,607
Patented June 12, 1956

2,749,607

METHOD OF PRODUCING COMPOSITE CURVED METALLIC SHAPES

William J. McIlvane, Mount Lebanon Township, Allegheny County, Pa., assignor to Copperweld Steel Company, Glassport, Pa., a corporation of Pennsylvania Application November 15, 1950, Serial No. 195,775

5 Claims. (Cl. 29—456)

This invention relates to a new method of producing composite curved metallic shapes by welding relatively similar metals together over the curved portion of each shape. More particularly, this invention pertains to the manufacture of ferrous cylinders having copper or other non-ferrous cladding metal uniformly bonded thereto. It is particularly well adapted to the production of steel brake drum cylinders with finned copper jackets thereon.

At the present time, flat sheets of copper-clad steel, for example, are well established commercial products. This cladding of copper is bonded to the steel at the interface between the two metals in a continuous and relatively uniform manner. At the same time, the amount of iron dissolved or fused into the copper adjacent that interface is readily held to a minimum figure so as to avoid undue impairment of the electrical and thermal conductivity of the copper.

However, in the cladding of cylindrical shapes such as steel brake drums with copper, the incidence of sound uniform bonds between the copper layer and the drum is uncertain to a very troublesome extent. Moreover, maintaining the amount of iron in the copper layer adjacent the interface in such curved shapes at a minimum content is more difficult and in certain types of manufacturing practice relatively impracticable. Yet a continuous and relatively bond over the entire interface is necessary especially in the case of brake drums for heavy-duty service. A factor which may contribute to the difficulty of proper bonding between copper and steel on curved surfaces such as a brake drum is the relative absence of any significant work on the metal after the copper layers are applied to the drum.

In this invention a practical method is set forth for producing a sound and uniform bond between a composite curved metallic shape and a cladding layer of another metal such as copper. Such bond is continuous over the entire interface between the different metals. Moreover, in the manufacture of the composite shape such as a ferrous cylinder with a copper jacket thereon the bonding on the curved portions is effected made between metals of the same kind. Such bonding between metals of the same kind is readily effected and precisely controlled and the difficulty of bonding dissimilar metals over a curved path is avoided. In achieving the new method of manufacture this invention utilizes a composite strip or ribbon such as a copper-clad strip of ferrous metal. Such strips may be made from relatively flat bimetallic sheets of the same character. These sheets unlike the curved surface composite metal bondings are readily produceable with a continuous, uniform and sound minimum iron content bond at the interface between the ferrous and non-ferrous metals.

Other objects and advantages of this invention will be apparent from the following description and drawings which are illustrative and schematic only, in which Figure 1 is a schematic showing of the production of a bimetallic cylinder in accordance with the teaching of this invention;

Figure 1:
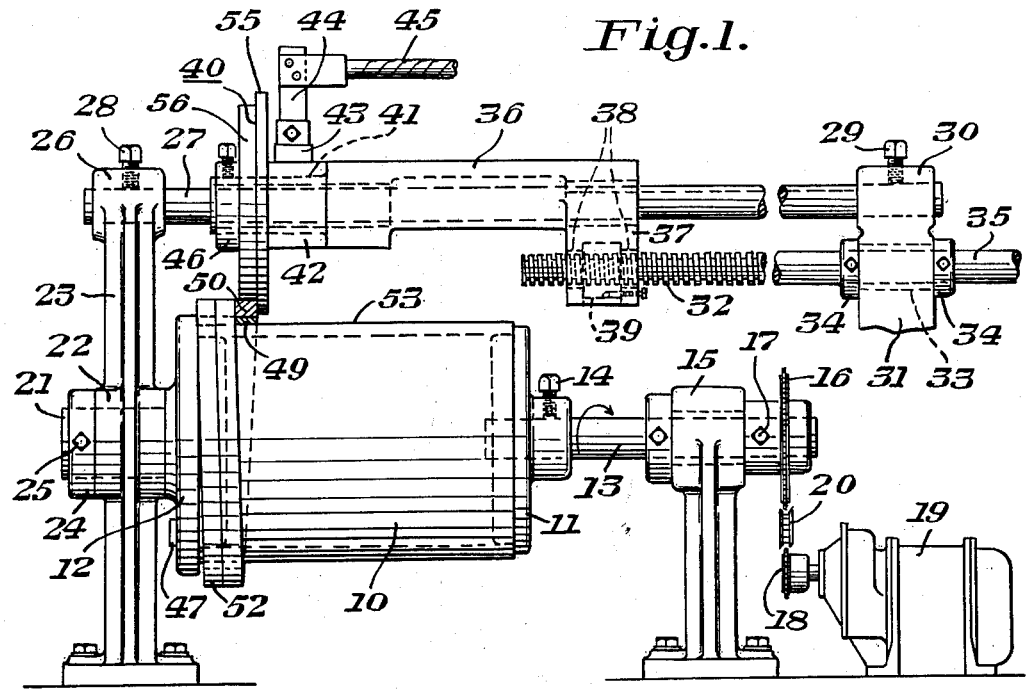

Referring to the drawings, a curved metallic shape 10 which may be a hollow steel or other ferrous metal brake drum cylinder, is rotatably mounted between two platen holders 11 and 12. Holder 11 is axially movable on a shaft 13 to accommodate different lengths of cylinders. A set screw 14 firmly attaches the holder 11 in holding position along the shaft 13. Shaft 13 is journaled in a pedestal 15 rigidly fastened to the plant floor or foundation. The journaling is sufficiently rigid and massive to support the inner end of shaft 13 in rigid cantilever fashion as shown in Figure 1. A driven sprocket wheel 16 is keyed to shaft 13 by a set screw 17. Inside pedestal 15 a conventional thrust bearing is provided to prevent outward endwise movement of shaft 13. A driving sprocket 18 is keyed to the output shaft of a combination conventional electric motor and gear reducer 19. Gear 18 is in alignment with gear 16 and drives the latter by means of a sprocket chain 20.

The other holder 12 is provided with a shaft stem 21 secured thereto. Shaft 21 extends through a bushing 22 in a pedestal 23 in which shaft 21 is journaled. A set screw collar 24 is secured by a set screw 25 to the outer end of shaft 21 to hold it in rotatable position without being subject to axial movement. The pressure of the platens 11 and 12 toward each other is sufficient to support cylinder 10 in coaxial relation to the axes of shafts 13 and 21. The axes of these shafts are in alignment. Hence, when motor 19 is operated, the ferrous drum 10 is rotated at whatever speed is desired.

Pedestal 23 is also bolted to the plant floor or foundation and is provided with an upper part 26. A supporting rod 27 passes through an opening in part 26 and is fastened to pedestal 23 by a set screw 28. The other end of rod 27 is similarly fastened by a set screw 29 in a mounting 30 at the upper end of a pedestal 31. As shown, the lower portion of pedestal 31 is broken away where it extends downwardly to each side of motor 19 so that it too can be affixed to the plant floor or foundation. A lead screw 32 is journaled in a bushing 33 in pedestal 31 and is prevented from moving axially by means of set collars 34. The outer end 35 of lead screw 32 is suitably rotated at desired speed by conventional means which are not illustrated.

A carriage 36 is supportably mounted on rod 27 for sliding axial movement along the said rod. Arm 37 integral with carriage 36 is provided with a clevis at the lower end thereof having an opening 38 through which lead screw 32 extends. A nut 39 is held between the two sides of the clevis in threaded engagement with screw 32. Thus as the screw 32 is turned, carriage 36 is correspondingly moved in one direction or the other as desired along supporting rod 27. In the embodiment shown, during operations the carriage 36 progresses from left to right as shown in Figure 1.

Guiding and welding head 40 is rotatably journaled on the reduced cylindrical end 41 of carriage 36. Head 40 has an integral hub 42 which is in constant contact with a brush 43 at the lower end of a bus 44 serving as a terminal of an electric conductor 45. A set collar 46 prevents axial movement of head 40 in that direction relative to carriage 36 just as hub 42 prevents axial movement thereof in the other direction. As is well understood by those in the welding machine art, head 40 is suitably insulated from the other portions of the machine. Similarly, a brush 47 is in constant contact with the outer face of platen 12 and to a further electrical conductor, not shown, which completes the circuit for the electric current used in the welding portion of the operation shown in Figures 1 and 2. Under such circumstances, platen 12 which is of a conducting metal is also insulated from the balance of the machine as is well understood in the art. Platen holder 11, on the other hand, may be faced with or entirely made of a nonconducting substance to avoid stray electric currents in the course of the welding operation.

Figure 2:
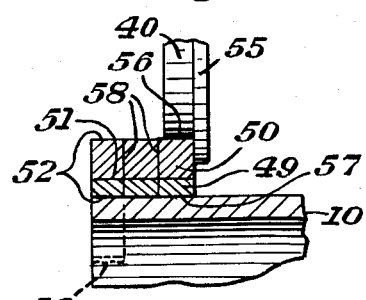
Figure 2 is an enlarged view of a portion of the assembly shown in Figure 1 illustrating the guiding and welding action thereof.
Figure 6:
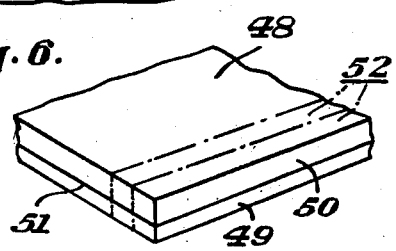
Figure 6 is a bimetallic sheet from which composite strips utilized in the practice of this invention may be obtained.

In the practice shown in Figures 1 and 2, resistance welding is performed but other types of welding may be used as will be readily apparent to those skilled in the welding art. In the practice of this invention, a conventional bimetallic sheet 48 may be used, such as the one of which a portion is shown in Figure 6. In such a sheet a ferrous base 49 is intimately and uniformly bonded to a cladding layer 50 of a metal such as copper. Such conventional flat sheets can be prepared by present-day commercial practice with a continuous bond at the interface between the metals therein. At the same time, in the zone of the bond between such metals there is a minimum iron content in the cladding layer 50, a situation which is highly desirable and advantageous for most effective thermal conductivity through the bonding zone. The bonding zone is shown in the various figures as a plane illustrated by lines 51 although in actual practice it is nevertheless a zone of relatively little thickness at the so-called interface between the metals. The ferrous base metal 49 is similar in composition to or at least compatible in a welding sense with the ferrous metal of the cylinder 10. In order to prepare strips 52 from sheet 48, gang saws or other type of standard shearing media may be used. Such parting or separation produces relatively long continuous strips 52 having the two metals thereof in bonded relation at the zone 51. These strips may be placed on a feeding table, not illustrated, and fed in a direction at right angles to the axis of drum 10 mounted as shown in Figure 1, the height of the feeding level for the strip 52 being used is such as to make it relatively tangential to the topmost cylindrical element 53 of cylinder 10.

In order to manufacture a composite curved metallic shape in accordance with this invention, a strip 52 may be tack welded at its forward end 54 on the extreme left-hand end of cylinder 10 adjacent holder 12. Then if cylinder 10 is rotated upwardly and rearwardly as shown in Figure 1 by the arrow on shaft 13, strip 52 may be guided by conventional means (not shown) and by the head 40 in a helical spiral, the turns of which will be in contact with each other around the exterior of drum 10. In the feeding of such strip 52 the ferrous base 49 thereof will be faced against the exterior of the ferrous cylinder 10 leaving the cladding metal 50 radially outwardly thereof.

An annular flange 55 of head 40 bears successively against that side of each turn of the strip 52 which faces the holder 11. The pitch of the threads on lead screw 32 is such and so coordinated with the rotation of shaft 13 that flange 55 guides and bears against the turns of the strip as they are wound on the cylinder 10. At the same time, the distance between the axis of rod 27 and the periphery of the turns of strip 52 on drum 10 equals or is slightly less than the radius from the center of the reduced portion 56 of head 40 to the circular side wall thereof. Such circular side wall as shown in Figures 1 and 2 presses against the exterior of the turns of strip 52 as they are applied with sufficient force to effect, in conjunction with the welding current, a weld between base 49 and the exterior of drum 10 in the contact surface area 57 therebetween being pressed by the head 40.

Such continuous welding of the turns of strip 52 as they are helically wound on drum 10 provides a uniform and continuous weld of the entire contacting surface between the ferrous bases 49 of the strips 52 and the peripheral exterior of drum 10. Neither the winding of strip 52 in helical turns on drum 10 nor the welding of the base 49 of the turns to the drum 10 in any way adversely affects the preexisting bond between the base 49 and the cladding metal 50. When the winding of turns of strip 52 and the welding illustrated in Figures 1 and 2 is completed, the hollow cylinder 10 will be continuously, uniformly and soundly bonded to an exterior peripheral cylinder of the cladding metal 50. If the drum 10 with the composite turns welded thereto is rotated in a bath of molten brazing material, the side contact surfaces 58 between the respective turns will also be welded together. In such case, not only would there be excellent thermal transfer outwardly in a radial direction from the ferrous metal 10 and 49 to the cladding metal 50 but there would also be effective thermal transfer across the contact areas 58 producing excellent heat equalization over the entire composite cylinder so that if any portion of the ferrous metal thereof were hotter, more rapid equalization of temperatures in the ferrous metal would take place.

Figure 3:
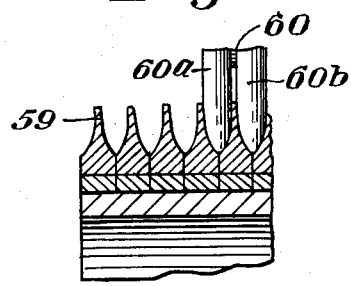
Figure 3 is a partial view of the bimetallic shape produced by the operation shown in Figures 1 and 2 during the forming of circumferential fins thereon.
Figure 4:
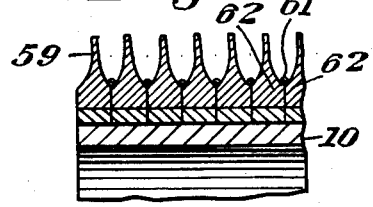
Figure 4 is a partial view of a further step following the operation performed as shown in Figure 3, in which further step brazing wire is positioned between fins adjacent the roots thereof.
Figure 5:
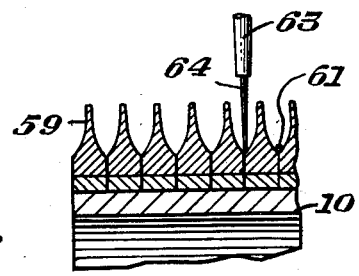
Figure 5 is a partial view of the same bimetallic shape in the course of a brazing operation thereon.

In most cases, however, where the cylinder 10 is to be made for example into a brake drum or engine cylinder, the cladding metal 50 will be copper or some other metal of high thermal conductivity. Moreover, it will usually be desirable to produce fins 59 from the outer portion at least of the cladding metal 50 as shown in Figures 3 to 5 to increase the rate of removal of heat from the ferrous portions 10 and 49 of the composite cylinder. Such fins may be cut or rolled by a suitable tool substituted on carriage 36 for the welding head 40. Thus, a shaped dual roller 60 may be mounted on neck 41 to roll peripheral fins 59 having a crest section of lesser width than the base thereof helically around the exterior of the composite cylinder 10—52 in the outer portion of the cladding metal 50 as shown in Figure 3. During the forming of the fins 59 between the rollers 60a and 60b, the drum 10 remains mounted between and rotates with the platen holders 11 and 12. After the rolling of the fins 59, a brazing wire 61 is wound between the fins 59 at the roots 62. The forward end of the brazing wire 61 may be attached by soldering it to the beginning of the root channel at the base of the adjoining fins 59 at that location. Then as shaft 13 turns, the brazing wire will be wound into the grooves between fins over the entire length of the composite drum 10—52.

To complete the brazing and weld the contact surfaces 58 between the joining turns of the strip 52, a torch head 63 may be mounted on neck 41 and suitably connected to a heating gas so that a flame 64 will impinge on the brazing wire 61 as shaft 13 is turned to melt the wire 61 and cause it to flow between the sides of the respective turns of the strip 52. Usually capillary attraction will be sufficient to obtain a complete bonding between such adjoining sides of the turns. This completion of the welding between the sides of the turns of strip 52 provides a composite cylinder in which the drum 10 is uniformly, soundly and intimately bonded to the circumferential fins 59 of cladding material.

It is apparent that if the composite drum 10 so produced is used as a brake drum for internally expanding brakes, a blanket of cladding material such as copper will exist around the exterior of the cylinder which together with the fins 59 of the same cladding metal product a most desirable form of structure for heat equalization and dissipation. Moreover, such structure is produced without any material impairment of the bond between the cladding metal and the ferrous metal and the iron content in the bonding zone therebetween remains at its original minimal figure. In addition, such bonding zone between the ferrous metal and the cladding metal such as copper as well as the welding zone between the ferrous metal of the cylinder and the ferrous metal of the strip applied thereto are uniform and free from voids or unwelded areas, thereby preventing "hot spots" or other impairment.

The practice of this invention also comprehends the preforming of bimetallic strips such as strip 52 into helical form having an internal diameter equal to the external diameter of the cylinder to which the helix is to be applied. Again, if the cylinder in such case is made of ferrous metal, the metal on the inside of the helix will also be of a compatible ferrous metal. The welding of the helix to the cylinder will then produce the desired uniform and trouble-free union between the respective metals in completing a composite cylinder in accordance with the teaching of this invention. In some cases, further, fins may be preformed on strips such as the strip 52 or on the exterior of the aforesaid helix. Moreover, other methods of brazing the adjoining sides of turns in the construction of a composite cylinder under this invention may be employed.

Further, in the practice of this invention, it may be convenient to use a composite strip or ribbon having a sufficient width sufficient for the formation of two or more fins therein. In some cases where the composite metal ribbon applied to the curved shape is wider than the width of the welding head used, a plurality of such welding heads can be employed so that the entire contacting area can be bonded as contact is made.

In the case of the use of a right circular cylinder as the base, the composite strip to be welded thereto in practicing this invention may take the form of a flat composite sheet bent into the shape of a similar right circular cylinder of the same height with an axially extending seam. Such similar right circular cylinder would have the similar metal for the welding operation on the side thereof facing the base metal shape and in addition have the diametrical dimension of the facing surface almost precisely the same as the diameter of the welding surface of the base cylinder. In this way, the base shape and the composite shape can be assembled axially and welded by a wide welding head roller extending the length of the two shapes leaving just the lengthwise seam of the similar composite cylinder to be brazed or otherwise welded closed to complete the operation.

Although in the preferred embodiment the use of ferrous and copper metals is discussed, the invention is also applicable to metals other than those so specified. Still further, although the description herein has concerned itself with the application of the invention to a cylindrical drum, such teaching may also be applied to curved surfaces such as a frustum of a cone or other types.

Various other modifications in the practice of this invention may be employed without departing from the scope thereof as defined in the appended claims.

I claim:

1. In a method of producing a composite metallic cylinder having a cladding metal layer and a dissimilar metal layer in generally concentric bonded relation over the entire interface between the ends of said cladding layer, the steps comprising, providing a cylinder of base metal, bonding a flat member of cladding metal to a flat member of a metal at least compatible with such base metal over the entire interface zone between such flat members to provide a flat composite bimetallic member the respective upper and lower surfaces of which are of such respective cladding and compatible metals, bending said bimetallic member to conform with a peripheral surface of said cylinder with the compatible metal in said bimetallic member in juxtaposition to said surface of said cylinder, and welding said bimetallic member directly to said cylinder in such position over the entire contact area between said bimetallic member and said cylinder by heat generated at the contact surface area between said base and said compatible metal.

2. In a method of producing a composite metallic cylinder having a cladding metal layer and a dissimilar metal layer in generally concentric bonded relation over the entire interface between said layers, the steps comprising, providing a cylinder of base metal, providing a generally flat bimetallic strip having a bonded interface zone between its respective upper and lower layers of such cladding metal and a metal compatible with such base metal for direct welding thereto, bending said bimetallic strip to conform with a peripheral surface of said cylinder with the compatible metal in said bimetallic strip in juxtaposition to said surface of said cylinder, utilizing said cylinder as a mandrel in such bending, electrically welding the compatible metal in said bimetallic strip directly to said cylinder over the entire contact zone between said bimetallic strip and said cylinder by the generation of heat in said contact zone, and positioning axially successive bends of said bimetallic member strips around said surface of said cylinder in axially adjoining contact relation to one another.

3. In a method of producing a composite generally bimetallic cylinder having a thermally conductive metal layer and a ferrous metal layer in generally concentric bonded relation over the entire interface between said layers, the steps comprising, providing a cylinder of a ferrous metal, providing a generally flat bimetallic sheet of such thermally conductive metal layer on one side and on the other side a ferrous metal layer at least compatible with the ferrous metal of said cylinder for purposes of direct welding thereto, said bimetallic sheet having an interface zone between its two layers, said layers being bonded over said entire interface zone, separating said bimetallic sheet along a line normal to said interface zone, spirally winding said bimetallic strip around said cylinder with said compatible ferrous metal in contact juxtaposition to the surface of said cylinder and the interface zone of said strip parallel to the axis of said cylinder, maintaining the sides of said strip in the course of said winding in transverse contact between the ends of the helix formed by said strip, electrically welding said bimetallic strip directly to said cylinder over the entire contact surface area between said bimetallic strip and said cylinder, and metal-joining the adjoining sides of adjoining turns of said strip about said cylinder, whereby a completely united composite metallic clad drum is formed.

4. In a method of producing a composite bimetallic cylinder having a cladding metal layer and a dissimilar metal layer in generally concentric bonded relation over the entire interface between said layers, the steps comprising, providing a cylinder of said dissimilar metal, winding a bimetallic strip into an axially closed spiral having an internal diameter equal to the external diameter of said cylinder, said bimetallic strip having two layers the outer of which constitutes said cladding metal layer and the inner of which constitutes a layer of a metal similar to the metal of said cylinder, positioning said cylinder and spiral in concentric relation, and electrically welding the inner similar metal layer of said spiral to the outside of said cylinder to bond said similar metal over the entire contact surface between it and the metal of said cylinder by the generation of heat at said contact surface, said welding employing electrodes at least one of which engages the outside cladding metal layer of said spiral during such welding.

5. In a method of producing a composite bimetallic cylinder having a cladding metal layer and a dissimilar metal layer in generally concentric bonded relation over the entire interface between said layers, the steps comprising, providing a cylinder of said dissimilar metal, winding a bimetallic strip into a tight spiral having an internal diameter equal to the external diameter of said cylinder, said bimetallic strip having two layers the outer of which constitutes said cladding metal layer and the inner of which constitutes a layer of a metal similar to the metal of said cylinder, positioning said cylinder and spiral in concentric relation, electrically welding the inner similar metal layer of said tight spiral to the outside of said cylinder to bond said similar metal over the entire contact surface between it and the metal of said cylinder, said welding employing electrodes at least one of which engages the outside cladding metal layer of said tight spiral during such welding, metal-joining the adjoining sides of said tight spiral, and forming circumferential fins of cladding metal in the outer portion of said cladding metal layer.

References Cited in the file of this patent

UNITED STATES PATENTS

| | | |
|---|---|---|
| 855,239 | Faries | May 28, 1907 |
| 1,159,644 | Brecht | Nov. 9, 1915 |
| 1,628,804 | Price | May 17, 1927 |
| 1,804,237 | Steenstrup | May 5, 1931 |
| 1,952,896 | Rudorff | Mar. 27, 1934 |
| 2,182,238 | Rasmussen | Dec. 5, 1939 |
| 2,330,556 | Carlson | Sept. 28, 1943 |
| 2,355,621 | Brown | Aug. 15, 1944 |
| 2,368,403 | Barnes | Jan. 30, 1945 |
| 2,378,646 | Manning | June 19, 1945 |
| 2,562,785 | Hill | July 31, 1951 |

FOREIGN PATENTS

| | | |
|---|---|---|
| 18,915 | Great Britain | 1890 |
| 487,950 | Great Britain | June 29, 1938 |